US012130097B2

(12) United States Patent
Turney et al.

(10) Patent No.: US 12,130,097 B2
(45) Date of Patent: Oct. 29, 2024

(54) CROSSFLOW HEAT EXCHANGER WITH STACKED DISTRIBUTION TUBES

(71) Applicant: Hamilton Sundstrand Corporation, Charlotte, NC (US)

(72) Inventors: Joseph E. Turney, Amston, CT (US); Robert H. Dold, Monson, MA (US); Kathryn L. Kirsch, East Haddam, CT (US); Matthew B. Kennedy, Vernon, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 37 days.

(21) Appl. No.: 17/945,135

(22) Filed: Sep. 15, 2022

(65) Prior Publication Data

US 2024/0093952 A1    Mar. 21, 2024

(51) Int. Cl.
*F28F 9/02* (2006.01)
*B33Y 80/00* (2015.01)
*F28F 9/22* (2006.01)

(52) U.S. Cl.
CPC .......... *F28F 9/0221* (2013.01); *F28F 9/0268* (2013.01); *F28F 9/22* (2013.01);
(Continued)

(58) Field of Classification Search
CPC ......... F28D 7/16; F28F 9/0275; F28F 9/0221; F28F 9/22
See application file for complete search history.

(56) References Cited

U.S. PATENT DOCUMENTS 2,044,455 A * 6/1936 Witzel .................. F25B 39/028
                                                165/174
2,099,186 A * 11/1937 Anderegg ............. F25B 39/028
                                                165/110
(Continued)

FOREIGN PATENT DOCUMENTS

CH          558510 A      1/1975
CN      106996706 A *     8/2017
(Continued)

OTHER PUBLICATIONS

Translation of KR20210019775A entitled Translation-KR20210019775A (Year: 2023).*
(Continued)

*Primary Examiner* — Paul Alvare
(74) *Attorney, Agent, or Firm* — CANTOR COLBURN LLP (57) ABSTRACT

A heat exchanger having: an inlet header having inlet tubes stacked against the first side of the heat exchanger; an outlet header having outlet tubes stacked against the second side of the heat exchanger, first inlet and outlet tubes have a same length as each other, second inlet and outlet tubes have the same length as each other and are longer than the first inlet and outlet tubes, and third inlet and outlet tubes have a same length as each other and are longer than the second inlet and outlet tubes; core channels extend from the first side to the second side of the heat exchanger, the core channels connect the inlet tubes to the outlet tubes such that: the first inlet tube and third outlet tube are connected; the second inlet tube and second outlet tube are connected; and the third inlet tube and first outlet tube are connected.

18 Claims, 5 Drawing Sheets

(52) U.S. Cl.
CPC ......... *B33Y 80/00* (2014.12); *F28F 2009/222* (2013.01); *F28F 2250/106* (2013.01)

(56) References Cited

U.S. PATENT DOCUMENTS

| | | | | |
|---|---|---|---|---|
| 5,901,785 | A * | 5/1999 | Chiba | F28F 9/027 165/DIG. 465 |
| 5,979,547 | A * | 11/1999 | Shinmura | F28F 9/027 165/174 |
| 6,736,191 | B1 * | 5/2004 | Lindberg | F28D 7/04 166/57 |
| 9,551,540 | B2 * | 1/2017 | Jindou | F28F 9/028 |
| 10,502,254 | B2 | 12/2019 | Dufour et al. | |
| 10,712,526 | B2 | 7/2020 | Hallock et al. | |
| 11,268,770 | B2 | 3/2022 | Ruiz et al. | |
| 2003/0111216 | A1 * | 6/2003 | Hirao | F28F 9/0278 165/95 |
| 2007/0056720 | A1 * | 3/2007 | Demuth | F28F 9/0278 165/158 |
| 2010/0242535 | A1 * | 9/2010 | Jianlong | F25B 39/028 62/524 |
| 2011/0000255 | A1 * | 1/2011 | Taras | F28F 9/0273 165/173 |
| 2011/0203308 | A1 * | 8/2011 | Chiang | F25B 39/028 165/174 |
| 2016/0298887 | A1 * | 10/2016 | Alahyari | F25B 39/00 |
| 2017/0089643 | A1 | 3/2017 | Arafat | |
| 2017/0363361 | A1 * | 12/2017 | Turney | F28D 7/0025 |
| 2018/0010857 | A1 * | 1/2018 | Yang | F28F 1/00 |
| 2019/0331066 | A1 * | 10/2019 | Loya | F28D 21/0003 |
| 2020/0080798 | A1 * | 3/2020 | Turney | F28F 9/0265 |
| 2020/0217591 | A1 * | 7/2020 | Henderson | F28F 1/022 |
| 2021/0140346 | A1 | 5/2021 | Thar et al. | |
| 2021/0179251 | A1 | 6/2021 | Funke | |
| 2021/0231383 | A1 | 7/2021 | Horoszczak | |

FOREIGN PATENT DOCUMENTS

| | | | |
|---|---|---|---|
| DE | 4319192 A1 * | 12/1994 | ............ F25B 39/028 |
| DE | 102016216245 A1 * | 3/2018 | ............ F28D 11/02 |
| FR | 1128148 A | 1/1957 | |
| JP | 2002303499 A * | 10/2002 | ............ F28F 9/0273 |
| JP | 2003161547 A * | 6/2003 | ............ F28F 9/027 |
| JP | 2013019581 A * | 1/2013 | |
| KR | 20210019775 A * | 2/2021 | |

OTHER PUBLICATIONS

Translation of JP2013019581A entitled Translation-JP2013019581A (Year: 2023).*
Extended European Search Reported issued in European Application No. 23184695.7 dated Feb. 7, 2024; 6 pages.

* cited by examiner

CROSSFLOW HEAT EXCHANGER WITH STACKED DISTRIBUTION TUBES

STATEMENT OF FEDERAL SUPPORT

This invention was made with government support under Government Contract No. DE-AR0001342 awarded by Department of Energy. The government has certain rights in the invention

BACKGROUND

The embodiments are directed to heat exchangers and more specifically to a crossflow heat exchanger with stacked distribution tubes.

Counterflow is a configuration for a heat exchanger that may be configured to maximize heat transfer. The configuration may reduce thermal stress by enabling a lower local temperature difference. Such configurations, however, may result in a high pressure drop, which could also induce stress challenges within the heat exchanger.

BRIEF SUMMARY

Disclosed is a heat exchanger including: a core having a first side and a second side, a top and a bottom; an inlet header located at the top of the first side, the inlet header having plural inlet tubes, the plural inlet tubes include a first inlet tube stacked against the first side of the heat exchanger, a second inlet tube stacked against the first inlet tube and a third inlet tube stacked against the second inlet tube; an outlet header located at the bottom of the second side, the outlet header having plural outlet tubes, the plural outlet tubes include a first outlet tube stacked against the second side of the heat exchanger, a second outlet tube stacked against the first outlet tube and a third outlet tube stacked against the second outlet tube, wherein the first inlet and outlet tubes have a same length as each other, the second inlet and outlet tubes have the same length as each other and are longer than the first inlet and outlet tubes, and the third inlet and outlet tubes have a same length as each other and are longer than the second inlet and outlet tubes; and core channels within the core that extend from the first side to the second side of the heat exchanger, wherein the core channels are fluidly isolated from each other within the core and connect the inlet tubes to the outlet tubes such that: the first inlet tube and third outlet tube are connected by the channels; the second inlet tube and second outlet tube are connected by the channels; and the third inlet tube and first outlet tube are connected by the channels.

In addition to one or more of the aspects of the heat exchanger or as an alternate the inlet tubes and the outlet tubes each define a header end and a terminal end; and each tube tapers towards the terminal end.

In addition to one or more of the aspects of the heat exchanger or as an alternate the heat exchanger is a counterflow heat exchanger.

In addition to one or more of the aspects of the heat exchanger or as an alternate the inlet tubes are connected to a same number of the core channels as each other; and the outlet tubes are connected to a same number of the core channels as each other.

In addition to one or more of the aspects of the heat exchanger or as an alternate the heat exchanger includes a first baffle on one side of the core channels; and a second baffle on another side of the core channels, wherein the first and second baffles are configured to direct a gas flow between the first side and the second side of the heat exchanger.

In addition to one or more of the aspects of the heat exchanger or as an alternate the heat exchanger includes a first set of heat fins that are coupled to the core channels and the first baffle; and a second set of heat finds that are coupled to the core channels and the second baffle.

In addition to one or more of the aspects of the heat exchanger or as an alternate the heat exchanger includes a case extending from the first side to the second side to surround the core and form a flow boundary for the gas flow.

In addition to one or more of the aspects of the heat exchanger or as an alternate the tubes and channels have a round cross section.

Disclosed is a method of manufacturing a heat exchanger, including: defining the heat exchanger to include: a core having a first side and a second side, a top and a bottom; an inlet header located at the top of the first side, the inlet header having plural inlet tubes, the plural inlet tubes include a first inlet tube stacked against the first side of the heat exchanger, a second inlet tube stacked against the first inlet tube and a third inlet tube stacked against the second inlet tube; an outlet header located at the bottom of the second side, the outlet header having plural outlet tubes, the plural outlet tubes include a first outlet tube stacked against the second side of the heat exchanger, a second outlet tube stacked against the first outlet tube and a third outlet tube stacked against the second outlet tube, wherein the first inlet and outlet tubes have a same length as each other, the second inlet and outlet tubes have the same length as each other and are longer than the first inlet and outlet tubes, and the third inlet and outlet tubes have a same length as each other and are longer than the second inlet and outlet tubes; and core channels within the core that extend from the first side to the second side of the heat exchanger, wherein the core channels are fluidly isolated from each other within the core and connect the inlet tubes to the outlet tubes such that: the first inlet tube and third outlet tube are connected by the channels; the second inlet tube and second outlet tube are connected by the channels; and the third inlet tube and first outlet tube are connected by the channels; and additively manufacturing the heat exchanger.

In addition to one or more of the aspects of the method or as an alternate, the method includes defining the heat exchanger such that: the inlet tubes and the outlet tubes each define a header end and a terminal end; and each tube tapers towards the terminal end.

In addition to one or more of the aspects of the method or as an alternate, the method includes defining the heat exchanger such that the heat exchanger is a crossflow heat exchanger.

In addition to one or more of the aspects of the method or as an alternate, the method includes defining the heat exchanger such that: the inlet tubes are connected to a same number of the core channels as each other; and the outlet tubes are connected to a same number of the core channels as each other.

In addition to one or more of the aspects of the method or as an alternate, the method includes defining the heat exchanger to include: a first baffle on one side of the core channels; and a second baffle on another side of the core channels, wherein the first and second baffles are configured to direct a gas flow between the first side and the second side of the heat exchanger.

In addition to one or more of the aspects of the method or as an alternate, the method includes defining the heat exchanger to include: a first set of heat fins that are coupled to the core channels and the first baffle; and a second set of heat finds that are coupled to the core channels and the second baffle.

In addition to one or more of the aspects of the method or as an alternate, the method includes defining the heat exchanger to include a case extending from the first side to the second side to surround the core and form a flow boundary for the gas flow.

In addition to one or more of the aspects of the method or as an alternate, tubes and channels have a round cross section.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1A:
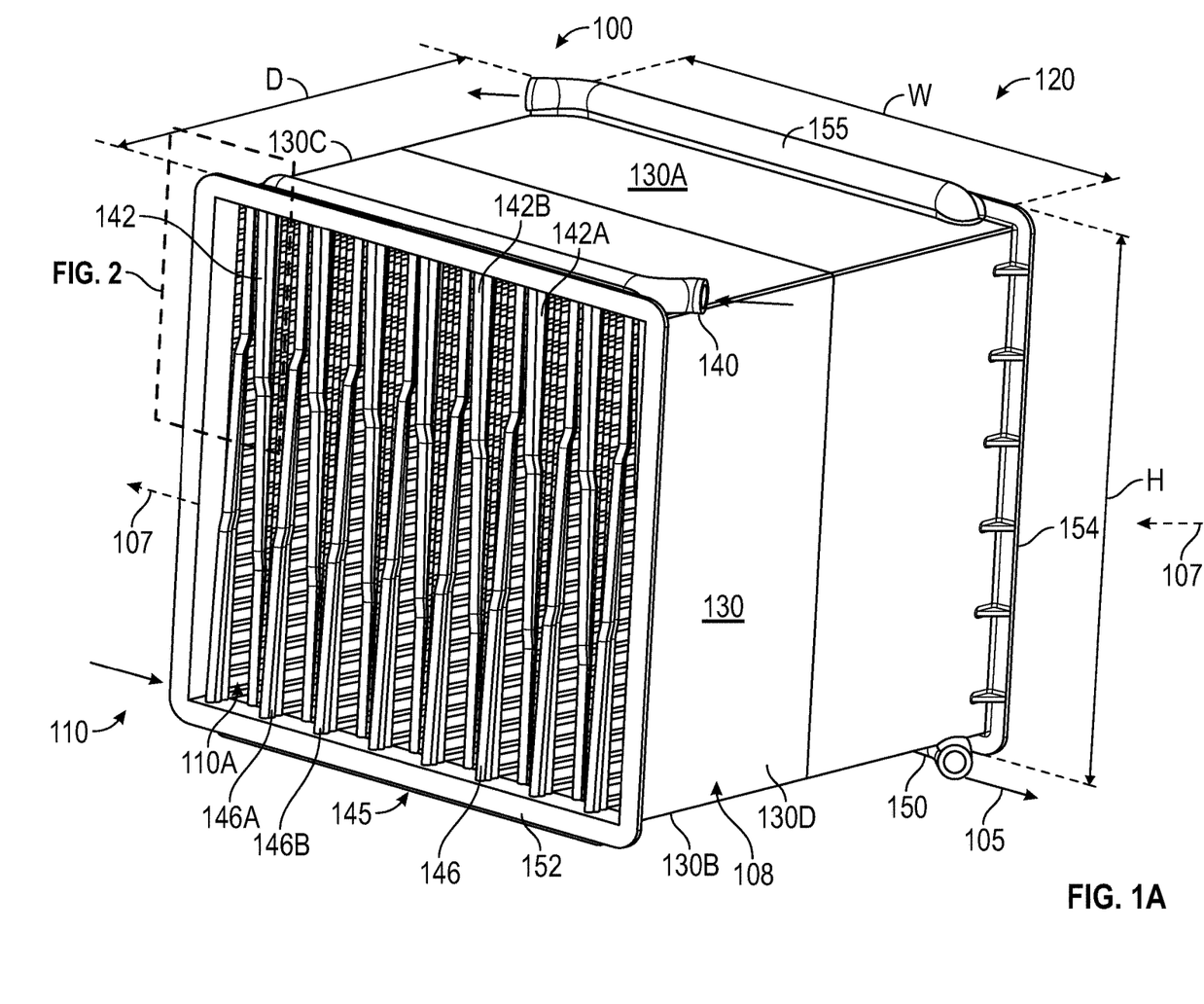
FIG. 1A shows front view of a heat exchanger 100 according to a disclosed embodiment.
Figure 1B:
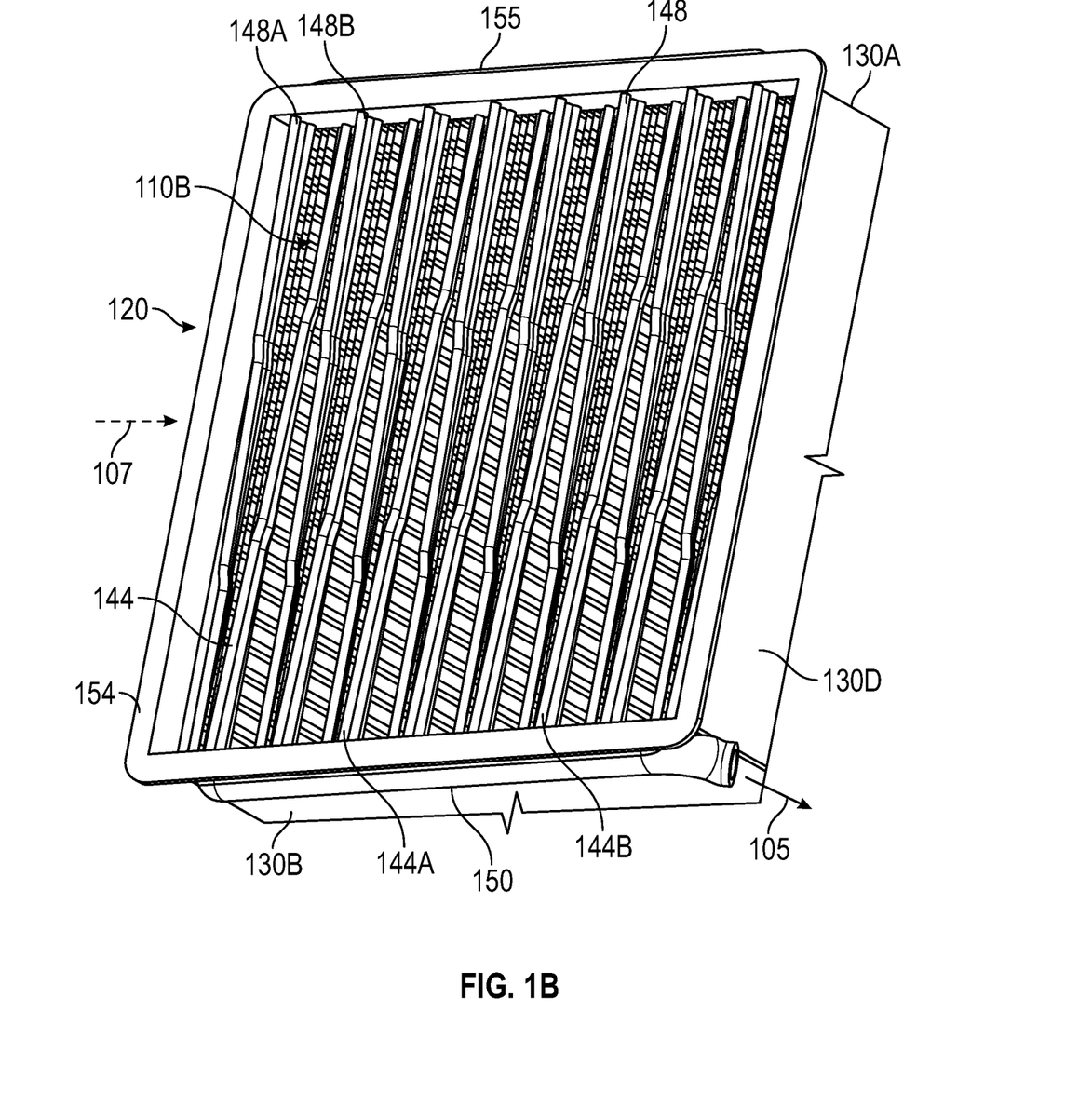
FIG. 1B shows rear view of a portion of the heat exchanger 100.

Turning to FIGS. 1A and 1B, as provided in greater detail below, the embodiments are directed to a counterflow heat exchanger 100 configured to reduce a pressure drop, and increase heat transfer, in the working fluid 105. The heat exchanger 100 therefore enables a greater amount of heat transfer between the working fluid 105 and a gas flow 107 through the heat exchanger 100.

The heat exchanger 100 may be an additively manufactured, or conventionally manufactured, crossflow heat exchanger having a first end 110 and a second end 120 separated from each other by a depth D of the heat exchanger 100. The first end 110 is a front end and the second end 120 is a back end of the heat exchanger 100. A case or shell 130 surrounds a core 108 of the heat exchanger 100 and the gas flow 107 may flow through the core 108 of the heat exchanger 100, e.g., through the shell 130. That is, the shell 130 forms a flow boundary through the core 108 of the heat exchanger 100. An outer shape of the heat exchanger 100 is square, though other shapes are within the scope of the embodiments. The shell 130 defines a top 130A, a bottom 130B, and opposite sides 130C, 130D of the heat exchanger 100. The top 130A and bottom 130B are separated from each other by a height H of the heat exchanger 100. The sides 130C, 130D are separated from each other by a width W of the heat exchanger 100.

The heat exchanger 100 has a first header 140, which may be an inlet header, on the top of the first end 110. A second header 150, which may be an outlet header, is on the bottom of the second end 120 of the heat exchanger 100. The first header 140 has sets of inlet distribution tubes (inlet tubes) 142 at the inlet transition region 110A of the first end 110 of the heat exchanger 100, e.g., at the transition to the core flow of the working fluid 105. The sets of inlet tubes 142 includes first and second sets 142A, 142B that are widthwise spaced apart from each other and extend heightwise along the first end 110 of the heat exchanger 100. The second header 150 has sets of outlet distribution tubes (outlet tubes) 144 at the outlet transition region 110B of the second end 120 of the heat exchanger 100, e.g., at the transition from the core flow of the working fluid 105. The sets of outlet tubes 144 includes first and second sets 144A, 144B that are widthwise spaced apart from each other and extend heightwise along the second end 120 of the heat exchanger 100. The sets of tubes on the of the first and second headers 140, 150 are fluidly coupled to each other as described in greater detail below. The first and second headers 140, 150 may be utilized to transport the working fluid 105 though the heat exchanger 100, e.g., between the first and second ends 110, 120 of the heat exchanger 100.

A third header 145 and a fourth header 155 are fluidly coupled to each other, similarly to the first and second headers 140, 150. The third header 145, which may be another inlet header, is located at the bottom of the first end 110 of the heat exchanger 100. The fourth header 155, which may be another outlet header, is located at the top of the second end 120 of the heat exchanger 100. That is, the third and fourth headers 145, 155 are on heightwise opposite sides of the heat exchanger 100 compared with the first and second headers 140, 150. The third header 145 has sets of inlet tubes 146, including first and second sets 146A, 146B, that are widthwise spaced apart from each other and extend heightwise along the first end 110 of the heat exchanger 100. Similar to the first and second headers 140, 150, the inlet tubes 146 are fluidly coupled with sets outlet tubes 148, including first and second sets 148A, 148B of the fourth header 155. The sets of outlet tubes 148 are widthwise spaced apart from each other and extend heightwise along the second end 120 of the heat exchanger 100. The third and fourth headers 145, 155 have the same function of transporting the working fluid 105 through the heat exchanger 100 as the first and second headers 140, 150. However, the third and fourth headers 145, 155 are fluidly isolated from the first and second headers 140, 150. It is to be appreciated that the third and fourth headers 145, 155, and related core flow therebetween of the working fluid 105, is optional.

A first perimeter lip 152 extends around a perimeter of the first end 110 and a second perimeter lip 154 extends around a perimeter of the second end 120. The perimeter lips 152, 154 are sized to be large enough to provide a sealing surface for gas flow 107.

Figure 2:
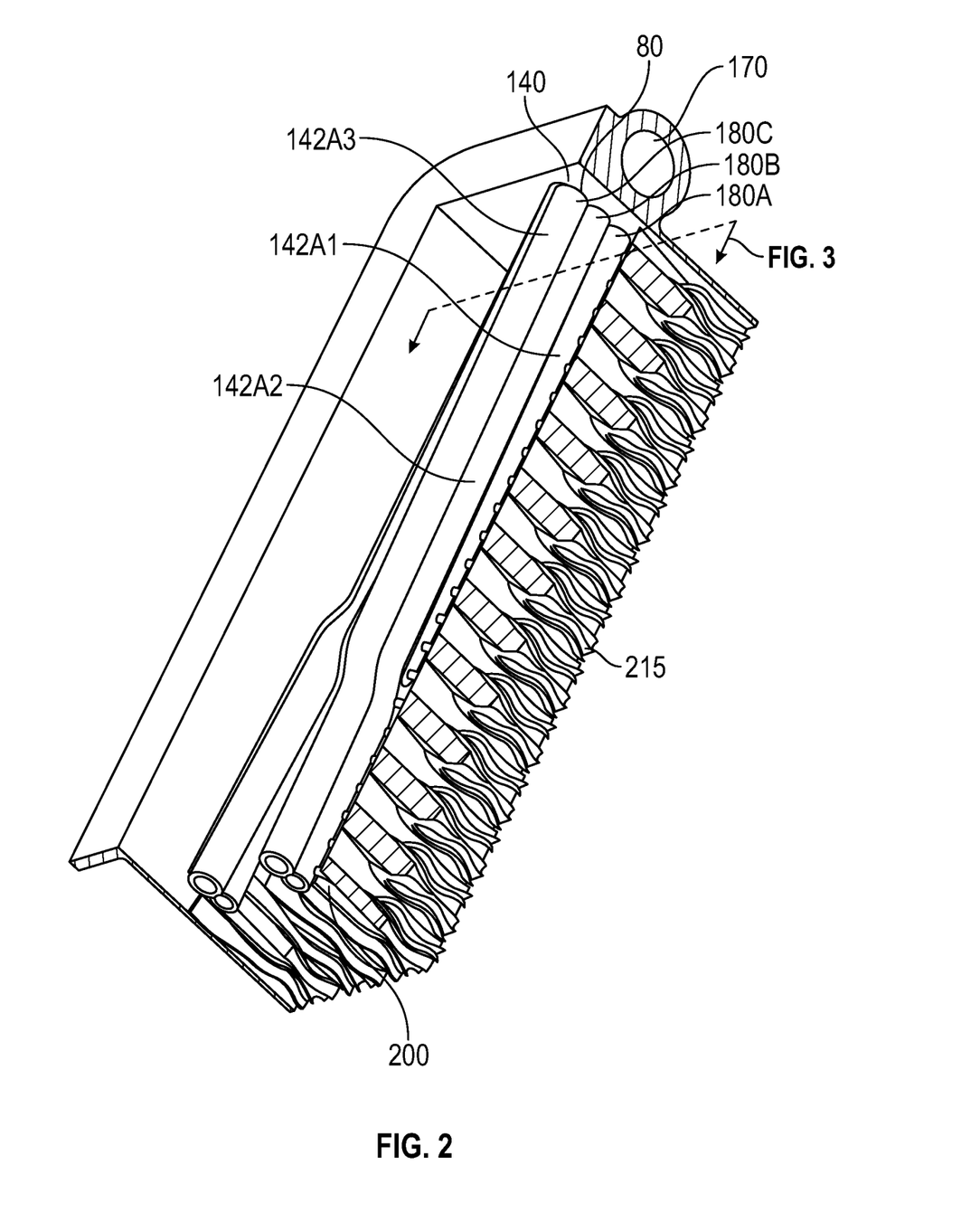
FIG. 2 shows a detail of a header of the heat exchanger.
Figure 3:
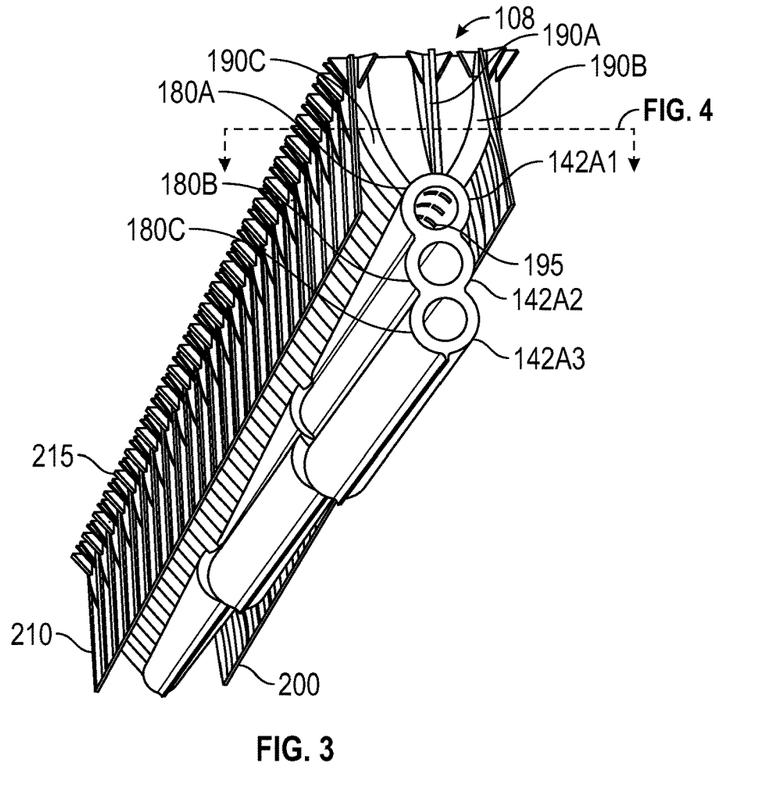
FIG. 3 shows tubes and channels fluidly coupled to the header, as well as baffles and heat fins surrounding the channels.

Turning to FIGS. 2 and 3, the first and second headers 140, 150 are configured the same as each other, so focus will be on the first header 140. The first header 140 has an inlet manifold (or manifold) 170. The first set of inlet tubes 142A has plural, e.g., two or more, though illustrated as three inlet tubes including first, second and third inlet tubes 142A1-A3 that are stacked, one on top of the other. Each of the inlet tubes 142A1-142A3 has a header end (or manifold end) 180A-C. At the header end 180A-C, the first inlet tube 142A1 is an interior tube, the second inlet tube 142A2 is an intermediate tube and the third inlet tube 142A3 is an exterior tube.

Figure 4:
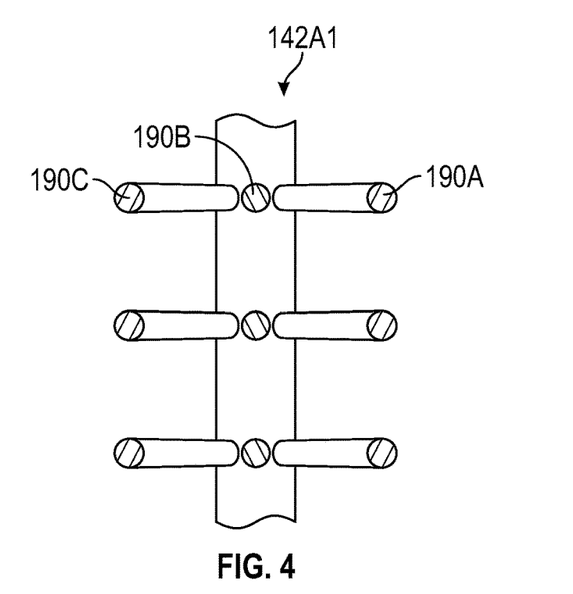
FIG. 4 shows channels connected to one of the tubes of the heat exchanger, with baffles and heat fins not shown.

Core channels (or channels) 190 trace a straight line path through the core of the heat exchanger 100 and fluidly couple the inlet tubes 142 to the outlet tubes 144, as discussed in greater detail below. The channels 190 are fluidly isolated from each other within the core 108. Baffles 200, 210, e.g., first and second baffles 200, 210, may be adjacent to each side of the channels 190 and extend through the depth of the heat exchanger 100. Heat fins 215 may be formed to extend between the channels 190 and the baffles 200. As shown in FIG. 4, there may be a plurality of sets of the channels 190A, 190B, 190C connected to the set of inlet tubes 142 via ports 195 in the inlet tubes 142.

Figure 5:
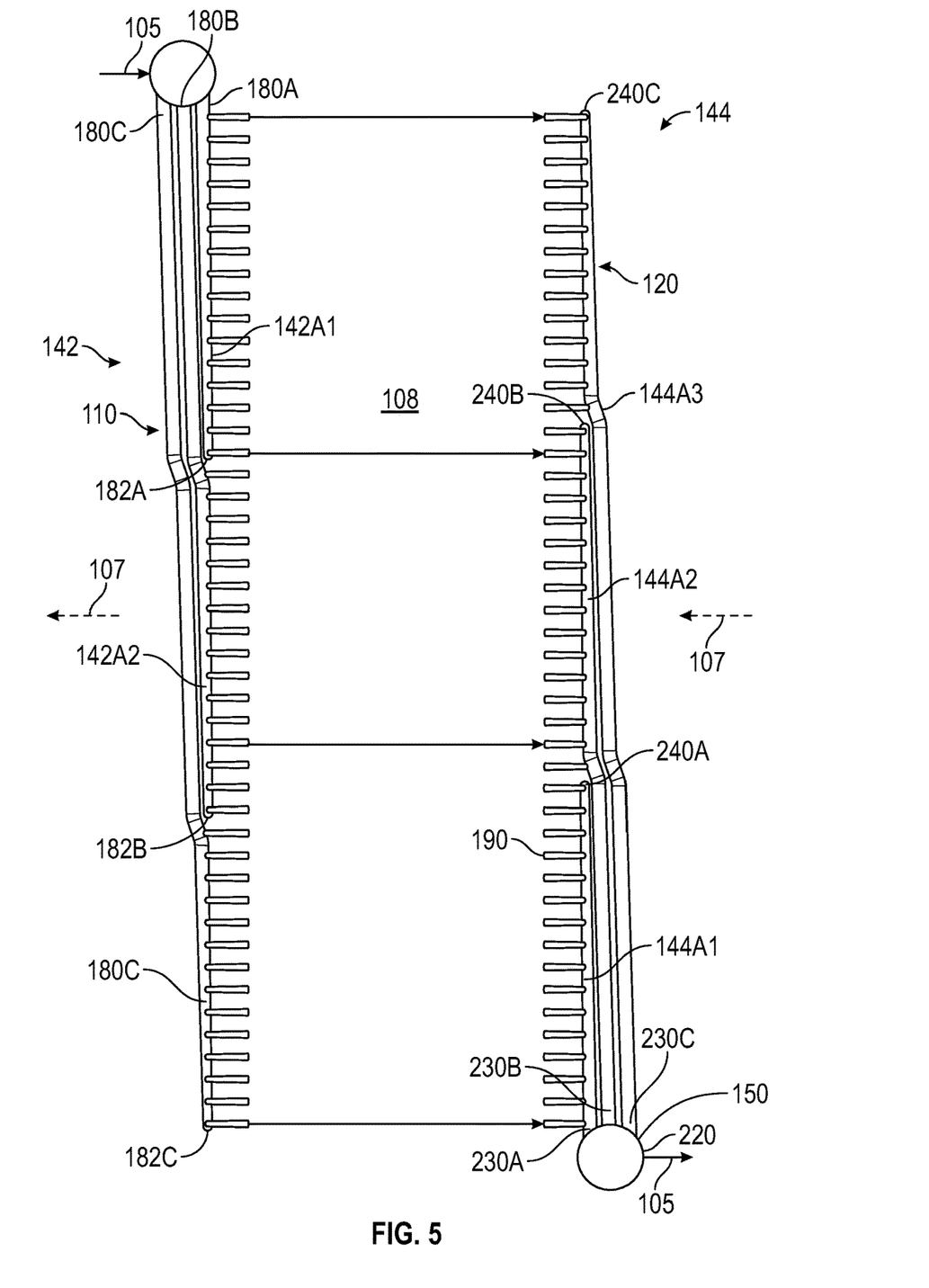
FIG. 5 shows tubes and channels of the heat exchanger.

Turning to FIG. 5, each of the inlet tubes 142A1-A3 on the first end 110 of the heat exchanger 110 has a terminal end 182A-C. From the header ends 180A-C to the terminal ends 182A-C, the third inlet tube 142A3 is longer than the second inlet tube 142A2, which is longer than the first inlet tube 142A1. The first inlet tube 142A1, is connected to the core channels 190 along its length, e.g., along the heightwise direction. The second inlet tube 142A2 is connected to channels 190 along its length that extends past the first inlet tube 142A1, e.g., in the heightwise downward direction. The third inlet tube 142A3 is connected to channels 190 along its length that extends past the second inlet tube 142A2, in the heightwise downward direction. In one embodiment, the inlet tubes 142 are connected to a same number of channels 190 as each other. As shown, the inlet tubes 142 taper towards the terminal ends 182A-C. By limiting a length and distribution requirements of each inlet tube 142, the pressure losses are reduced. In addition, by reducing the diameter of each tube 142 towards its terminal ends 182A-C, pressure losses are further reduced. Thus the efficiency of heat transfer from the working fluid 105 to the gas flow 107 in the core 108 is increased.

On the second end 120 of the heat exchanger 100, the second header 150 has an outlet manifold (or manifold) 220. The first set of outlet tubes 144A has plural, e.g., two or more, though illustrated as three tubes including first, second and third outlet tubes 144A1-A3 that are stacked, one on top of the other. Each of the outlet tubes 144A1-144A3 has a header end (or manifold end) 230A-C. At the header end 230A-C, the first outlet tube 144A1 is an interior tube, the second outlet tube 144A2 is an intermediate tube and the third outlet tube 144A3 is an exterior tube.

Each of the outlet tubes 144A1-A3 has a terminal end 240A-C. From the manifold 220 to the terminal ends 240A-C, the third outlet tube 144A3 is longer than the second outlet tube 144A2, which is longer than the first outlet tube 144A1. The first outlet tube 144A1, is connected to channels 190 along its length. The second outlet tube 144A2 is connected to channels 190 along its length that extends past the first outlet tube 144A1, e.g., in the heightwise upward direction. The third outlet tube 144A3 is connected to channels 190 along its length that extends past the second outlet tube 144A2, in the heightwise upward direction.

The first inlet and outlet tubes 142A1, 144A1 may be the same length as each other, the second inlet and outlet tubes 142A2, 144A2 may be the same length as each other, and the third inlet and outlet tubes 142A3, 144A3 may be the same length as each other. The outlet tubes 144 taper towards the terminal ends 240A-C. As indicated, the outlet tubes 144 are the same configuration as the inlet tubes 142, except that they are inverted in the heightwise direction. As with the inlet tubes 142, by limiting a length and distribution requirements of each outlet tube 144, the pressure losses are reduced. In addition, by reducing the diameter of each outlet tube 144 towards its terminal ends 240A-C, more uniform flow through channels 190 is produced. Thus the efficiency of heat transfer from the working fluid 105 to the gas flow 107 in the core 108 is further increased.

As shown in FIG. 5, the channels 190 fluidly couple the first inlet tube 142A1 with the third outlet tube 144A3, the second inlet tube 142A2 with the second outlet tube 144A2 and the third inlet tube 142A3 with the first outlet tube 144A2. The channels 190 also fluidly couple the terminal end 182A of the first inlet tube 142A1 with the terminal end 240B of the second outlet tube 144A2 and the terminal end 182B of the second inlet tube 142A2 with the terminal end 240A of the first outlet tube 144B2. This fluid coupling configuration helps to maintain equal flow within the tubes.

The above embodiments provide a heat exchanger 100 that is compact and efficient. The heat exchanger 100 is suitable for high pressure and temperature applications. For example, fluid 105 will generally be at a higher pressure, such as 10 bar, and density than fluid 107. The stacked design of the tubes provides a direct path for the working fluid 105 to enter the core channels 190, without impeding fluid 107, reducing pressure drop and improving heat transfer. In one embodiment, the tubes and channels have a round cross section.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A heat exchanger comprising:
   a core having a front end and a back end that are depthwise spaced apart from each other, a first side and a second side that are width-wise spaced apart from each other, a top and a bottom that are heightwise spaced apart from each other;
   an inlet header that is a first tubular manifold located at the top of the core and extending along the front end of the core, between the first and second sides of the core, through which a working fluid flows,
   plural of sets of inlet tubes, extending height-wise from the header along the front end of the core, between the top and bottom of the core, and each of the sets of inlet tubes are width-wise spaced apart from each other along the inlet header,
   each of the plural inlet tubes include a first inlet tube positioned depthwise against the front end of the heat exchanger, a second inlet tube positioned depthwise against the first inlet tube and a third inlet tube positioned depthwise against the second inlet tube, wherein the plural inlet tubes are fluidly isolated from each other away from the inlet header;
   an outlet header that is a second tubular manifold located at the bottom of the core and extending along the back end of the core between the first and second sides of the core through which the working fluid flows, plural sets of outlet tubes extending height-wise from the header along the back end of the core, between the top and bottom of the core, and each of the sets of outlet tubes are width-wise spaced apart from each other along the inlet header to align with ones of the sets of inlet tubes, each of the plural outlet tubes include a first outlet tube positioned depthwise against the back end of the heat exchanger, a second outlet tube positioned depthwise against the first outlet tube and a third outlet tube positioned depthwise against the second outlet tube, wherein the plural outlet tubes are fluidly isolated from each other away from the outlet header, wherein the first inlet and outlet tubes have a same length as each other, the second inlet and outlet tubes have the same length as each other and are longer than the first inlet and outlet tubes, and the third inlet and outlet tubes have a same length as each other and are longer than the second inlet and outlet tubes; and core channels, within the core that extend depthwise from the front end to the back end of the heat exchanger, wherein the core channels are fluidly isolated from each other within the core and connect the inlet tubes to the outlet tubes such that: the first inlet tube and third outlet tube are connected by the channels; the second inlet tube and second outlet tube are connected by the channels; and the third inlet tube and first outlet tube are connected by the channels.

2. The heat exchanger of claim 1, wherein:
the inlet tubes and the outlet tubes each define a header end and a terminal end; and
each tube tapers towards the terminal end.

3. The heat exchanger of claim 1, wherein the heat exchanger is a counterflow heat exchanger.

4. The heat exchanger of claim 1, wherein:
each of the inlet tubes are connected to a same number of the core channels; and
each of the outlet tubes are connected to a same number of the core channels.

5. The heat exchanger of claim 1, further comprising:
a first baffle on one side of the core channels; and
a second baffle on another side of the core channels,
wherein the first and second baffles are configured to direct a gas flow between the front end and the back end of the heat exchanger.

6. The heat exchanger of claim 5, including:
a first set of heat fins that are coupled to the core channels and the first baffle; and
a second set of heat fins that are coupled to the core channels and the second baffle.

7. The heat exchanger of claim 1, including a case extending from the front end to the back end to surround the core and form a flow boundary for the gas flow.

8. The heat exchanger of claim 1, wherein the manifolds, tubes and channels each have a circular cross section.

9. A method of manufacturing a heat exchanger, comprising:
defining the heat exchanger of claim 1; and
additively manufacturing the heat exchanger.

10. The method of claim 9, comprising defining the heat exchanger such that:
the inlet tubes and the outlet tubes each define a header end and a terminal end; and
each tube tapers towards the terminal end.

11. The method of claim 9, comprising defining the heat exchanger such that the heat exchanger is a crossflow heat exchanger.

12. The method of claim 9, comprising defining the heat exchanger such that:
each of the inlet tubes are connected to a same number of the core channels; and
each of the outlet tubes are connected to a same number of the core channels.

13. The method of claim 9, comprising defining the heat exchanger to include:
a first baffle on one side of the core channels; and
a second baffle on another side of the core channels,
wherein the first and second baffles are configured to direct a gas flow between the front end and the back end of the heat exchanger.

14. The method of claim 13, comprising defining the heat exchanger to include:
a first set of heat fins that are coupled to the core channels and the first baffle; and
a second set of heat fins that are coupled to the core channels and the second baffle.

15. The method of claim 9, comprising defining the heat exchanger to include a case extending from the front end to the back end to surround the core and form a flow boundary for the gas flow.

16. The method of claim 9, wherein the manifolds, tubes and channels each have a circular cross section.

17. The heat exchanger of claim 1, wherein the front end and back end of the core are each square shaped.

18. The method of claim 9, wherein the front end and back end of the core are each square shaped.

\* \* \* \* \*